United States Patent
Kato et al.

(10) Patent No.: US 7,914,942 B2
(45) Date of Patent: Mar. 29, 2011

(54) FUEL CELL VEHICLE

(75) Inventors: Takashi Kato, Shioya-gun (JP); Makoto Anazawa, Utsunomiya (JP); Takatsugu Koyama, Utsunomiya (JP); Mitsunori Matsumoto, Utsunomiya (JP); Masato Nakaarai, Kawachi-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 1179 days.

(21) Appl. No.: 11/287,520

(22) Filed: Nov. 23, 2005

(65) Prior Publication Data

US 2006/0113131 A1 Jun. 1, 2006

(30) Foreign Application Priority Data

| Nov. 26, 2004 | (JP) | 2004-343118 |
| Nov. 26, 2004 | (JP) | 2004-343120 |
| Nov. 26, 2004 | (JP) | 2004-343121 |
| Oct. 24, 2005 | (JP) | 2005-308407 |
| Oct. 24, 2005 | (JP) | 2005-308508 |
| Oct. 26, 2005 | (JP) | 2005-311435 |

(51) Int. Cl.
  *H01M 2/08* (2006.01)
(52) U.S. Cl. .................. 429/507; 429/512
(58) Field of Classification Search .......... 429/34
  See application file for complete search history.

(56) References Cited

U.S. PATENT DOCUMENTS

| 5,392,873 A * | 2/1995 | Masuyama et al. ............ 180/68.5 |
| 7,261,964 B2 * | 8/2007 | Andreas-Schott et al. ...... 429/34 |
| 2003/0062204 A1 * | 4/2003 | Kato et al. ..................... 180/65.1 |
| 2005/0202304 A1 * | 9/2005 | Peace et al. ...................... 429/37 |

FOREIGN PATENT DOCUMENTS

| JP | 7-47892 | 2/1995 |
| JP | 9-104241 | 4/1997 |
| JP | 2002-367648 | 12/2002 |
| JP | 2002-367651 | 12/2002 |
| JP | 2003-151605 | 5/2003 |
| JP | 2003-229148 | 8/2003 |
| JP | 2003-229150 | 8/2003 |
| JP | 2003-297377 | * 10/2003 |
| JP | 2004-58697 | 2/2004 |
| JP | 2004-127778 | * 4/2004 |
| JP | 2004-146135 | 5/2004 |
| JP | 2004-161055 | 6/2004 |
| JP | 2004-161057 | 6/2004 |

OTHER PUBLICATIONS

Japanese Office Action for Application No. 2005-308508, dated Feb. 9, 2010.
Japanese Office Action for Application No. 2005-311435, dated Sep. 7, 2010.
Japanese Office Action for Application No. 2005-308508, dated Sep. 21, 2010.

* cited by examiner

*Primary Examiner* — Ula C Ruddock
*Assistant Examiner* — Jacob Marks
(74) *Attorney, Agent, or Firm* — Nelson Mullins Riley & Scarborough LLP; Anthony A. Laurentano, Esq.

(57) ABSTRACT

The fuel cell vehicle, includes a fuel cell generating electricity by an electrochemical reaction of hydrogen and oxygen; an accessory for the fuel cell; and a fuel cell system box mounted on a vehicle body and housing the fuel cell and the accessory, wherein the fuel cell system box is formed in a vessel shape which has a bottom wall, a first side wall, and a second side wall, the first side wall supporting at least one pipe through which a fluid supplied to the fuel cell flows, and the first side wall is constituted of a material having a specific gravity that is greater than that of the bottom wall and the second wall.

17 Claims, 14 Drawing Sheets

FUEL CELL VEHICLE

BACKGROUND OF THE INVENTION

1. Field of the Invention

The present invention relates to a fuel cell vehicle, and particularly to a fuel cell vehicle provided with anti-vibration measures in a fuel cell system box that houses fuel cells and the like, and to a fuel cell vehicle able to rapidly measure the hydrogen concentration inside the casing that houses the fuel cells and the like.

Priority is claimed on Japanese Patent Application No. 2004-343118, filed on Nov. 26, 2004, Japanese Patent Application No. 2004-343120, filed on Nov. 26, 2004, Japanese Patent Application No. 2004-343121, filed on Nov. 26, 2004, Japanese Patent Application No. 2005-308407, filed on Oct. 24, 2005, Japanese Patent Application No. 2005-308508, filed on Oct. 24, 2005, and Japanese Patent Application No. 2005-311435, filed on Oct. 26, 2005, the contents of which are incorporated herein by reference.

2. Description of Related Art

Fuel cell vehicles mounting fuel cells have previously been known. With regard to the mounting of fuel cells, a variety of countermeasures against vehicle vibration have been proposed. For example, there is a proposal that provides elastic mount member on the fuel cell, and that installs the fuel cell in the housing case via the mount member (see Japanese Unexamined Patent Application, First Publication Nos. 2002-367651 and 2003-297377).

Moreover, when mounting the fuel cells, a variety of ventilation configurations are adopted for conducting ventilation of the interior of the casing that houses the fuel cells for reasons related to the use of hydrogen gas (see Japanese Unexamined Patent Application, First Publication No. 2004-161057).

It is necessary to connect pipes to the fuel cells for supply of the reaction gas and the coolant, and the piping is configured so as to pass through the walls of the case that houses the fuel cells. Accordingly, when the feed pipes of the reaction gas and the coolant vibrate, this is transmitted to the fuel cells, which is undesirable and which tends to ruin quiet in the vehicle compartment.

Conventional fuel cell vehicles have the merit of being able to elastically support the fuel cells relative to the housing case via the mount members, but there is the problem that it is not possible to fully secure support rigidity relative to the housing case of the fuel cells. Moreover, there is the problem that it is difficult to set the placement positions of the mount members.

With conventional fuel cell vehicles, in the case where the interior of the casing that houses the fuel cells is ventilated, it is necessary to provide a hydrogen sensor inside the casing, and to conduct the ventilation based on the measurement results of the hydrogen sensor. In this regard, when the measurement accuracy of the hydrogen sensor is low, there is the problem that this engenders the trouble of having to conduct ventilation more than is necessary. When a plurality of hydrogen sensors are provided in order to raise measurement accuracy, there is the problem that it leads to higher cost.

SUMMARY OF THE INVENTION

An object of the invention is to provide a fuel cell vehicle that is able to reliably prevent vibration from the various pipes, protect the fuel cells, and enhance quiet.

Another object of the invention is to provide a fuel cell vehicle that is able to improve the measurement accuracy of the hydrogen sensor.

The fuel cell vehicle of the invention includes: a fuel cell generating electricity by an electrochemical reaction of hydrogen and oxygen; an accessory for the fuel cell; and a fuel cell system box mounted on a vehicle body and housing the fuel cell and the accessory, wherein the fuel cell system box is formed in a vessel shape which has a bottom wall, a first side wall, and a second side wall, the first side wall supporting at least one pipe through which a fluid supplied to the fuel cell flows, and the first side wall is constituted of a material having a specific gravity that is greater than that of the bottom wall and the second wall.

In the fuel cell vehicle of the invention, the pipe may pass through the first side wall.

According to the fuel cell vehicle, it is possible to prevent the vibration transmitted from the pipes from being transmitted to other parts by increasing the support rigidity of the hydraulic pipes, with the result that the fuel cell can be protected from vibration and quiet can be enhanced.

In the fuel cell vehicle of the invention, the first side wall may be constituted of an iron material, and the bottom wall and the second side wall may be constituted of an aluminum material.

According to the fuel cell vehicle, it is possible to plan the entire fuel cell system box to be more lightweight, while ensuring the support rigidity of the pipes, with the result that one can plan a more lightweight vehicle, and contribute to improved fuel consumption.

In the fuel cell vehicle of the invention, the first side wall having a coating thereon may be connected to the bottom wall and the second side wall by riveting.

According to the fuel cell vehicle, it is possible to prevent the direct contact of the iron material and the aluminum material, with the result that one can prevent electrocorrosion.

In the fuel cell vehicle of the invention, the fuel cell system box may have front and rear skeletal members provided at the front and rear of the bottom wall and extending in a widthwise direction of the vehicle, an anti-vibration material is disposed between the front and rear skeletal members, and the fuel cell is fixed to the front and rear skeletal members.

According to the fuel cell vehicle, it is possible to reliably fix the fuel cell to the fuel cell system box by the front and rear skeletal members, and to prevent the vibration of the bottom face of the fuel cell system box from being transmitted to the fuel cell by anti-vibration material, with the result that one can stably support the fuel cell, protect the fuel cell, and enhance quiet.

In the fuel cell vehicle of the invention, the anti-vibration material is covered by plates fixed to the front and rear skeletal members.

According to the fuel cell vehicle, it is possible to suppress the surface vibration of the plates by attaching the plates to the front and rear skeletal members, with the result that one can enhance quiet.

In the fuel cell vehicle of the invention, the vehicle may further include: a lid covering an upper part of the fuel cell system box and having an under surface formed with a varying height; and a hydrogen sensor placed at an elevated position inside the fuel cell system box and measuring a hydrogen concentration inside the fuel cell system box.

According to the fuel cell vehicle, hydrogen gas with a lower specific gravity than air can be measured by a hydrogen sensor at an elevated position inside the fuel cell system box that is advantageous for purposes of measurement accuracy. The hydrogen sensor can be placed at a high position on the bottom face of the top wall. Accordingly, measurement accuracy can be increased. Moreover, the hydrogen sensor can be placed at a high position on the bottom face of the top wall, with the result that it is unnecessary to provide a plurality of hydrogen sensors, and it is possible to undertake cost reductions.

In the fuel cell vehicle of the invention, the lid has spacers varying the height of the undersurface of the lid and guiding the hydrogen to the hydrogen sensor.

According to the fuel cell vehicle, it is possible to adjust the bottom face of the lid—that is, the effective height of the fuel cell system box—by the height adjusting spacers, and to gradually guide the hydrogen gas to a high place where measurement can be conducted by the hydrogen sensor, with the result that a single hydrogen sensor can reliably and accurately conduct measurement.

In the fuel cell vehicle of the invention, the vehicle may further include an air conveyance means conveying ventilation air into the fuel cell system box, wherein the hydrogen sensor is arranged downstream of the ventilation air inside the fuel cell system box.

According to the fuel cell vehicle, the ventilation air inside the fuel cell system box from the air conveyance means can be quickly measured by the hydrogen sensor, with the result that measurement can be conducted within a short period of time.

In the fuel cell vehicle of the invention, the accessory has hydrogen system accessory supplying hydrogen to the fuel cell or discharging hydrogen from the fuel cell.

According to the fuel cell vehicle, a common hydrogen sensor can conduct measurement of the hydrogen concentration in the vicinity of the fuel cell stacks and the hydrogen system accessory where the hydrogen concentration would seem to be higher compared to other accessory equipment. Accordingly, measurement can be quickly conducted in a short period of time by the hydrogen sensor, and that the prescribed protective operations can be adopted.

DETAILED DESCRIPTION OF THE INVENTION

Next, the first embodiment of the invention is explained with reference to drawings.

Figure 1:
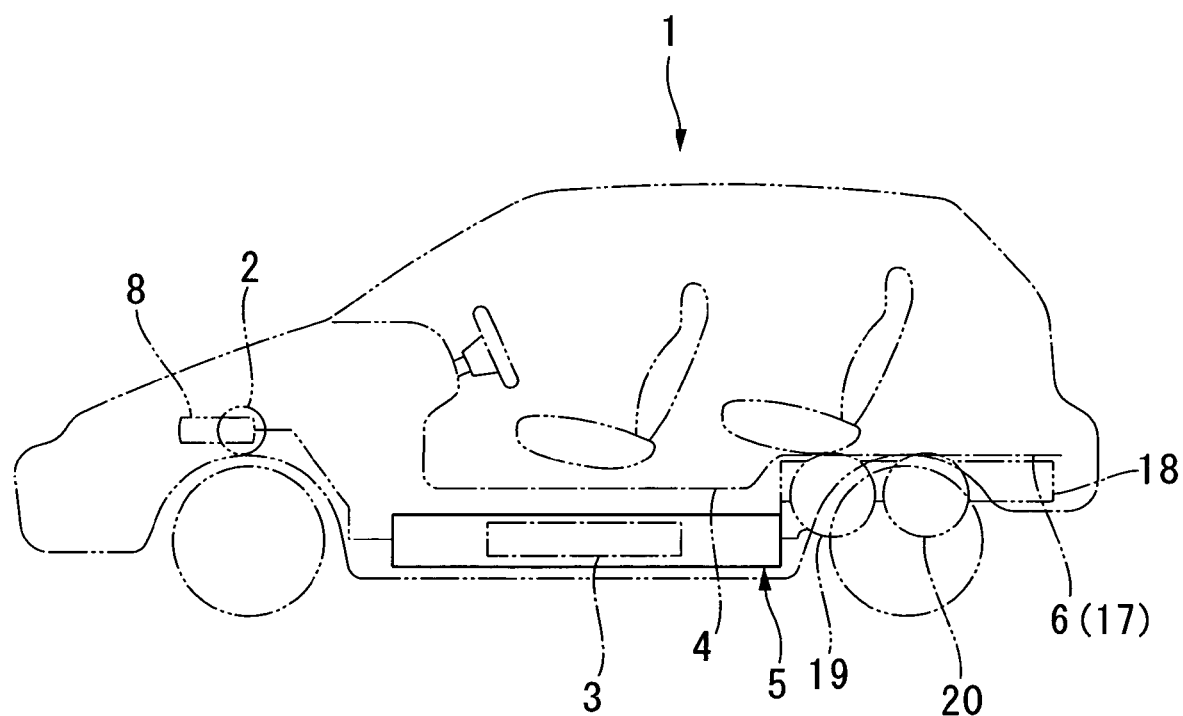
FIG. 1 is a lateral perspective view of the fuel cell vehicle of an embodiment of the invention.

As shown in FIG. 1, the fuel cell vehicle 1 mounts fuel cells 3 that generate electricity by the electrochemical reaction of hydrogen and oxygen, and the motor is driven and movement occurs by the power produced from the generation of electricity. The fuel cell 3 is housed inside the fuel cell system box (casing) 5 that is installed on the bottom face of the front floor 4. Power generation is conducted by the hydrogen gas supplied from the hydrogen tanks 19 and 20 arranged under the rear floor 6 in the rear part of the carbody and by the oxygen in the air supplied from the compressor 8 provided in the front part of the carbody.

Figure 2:
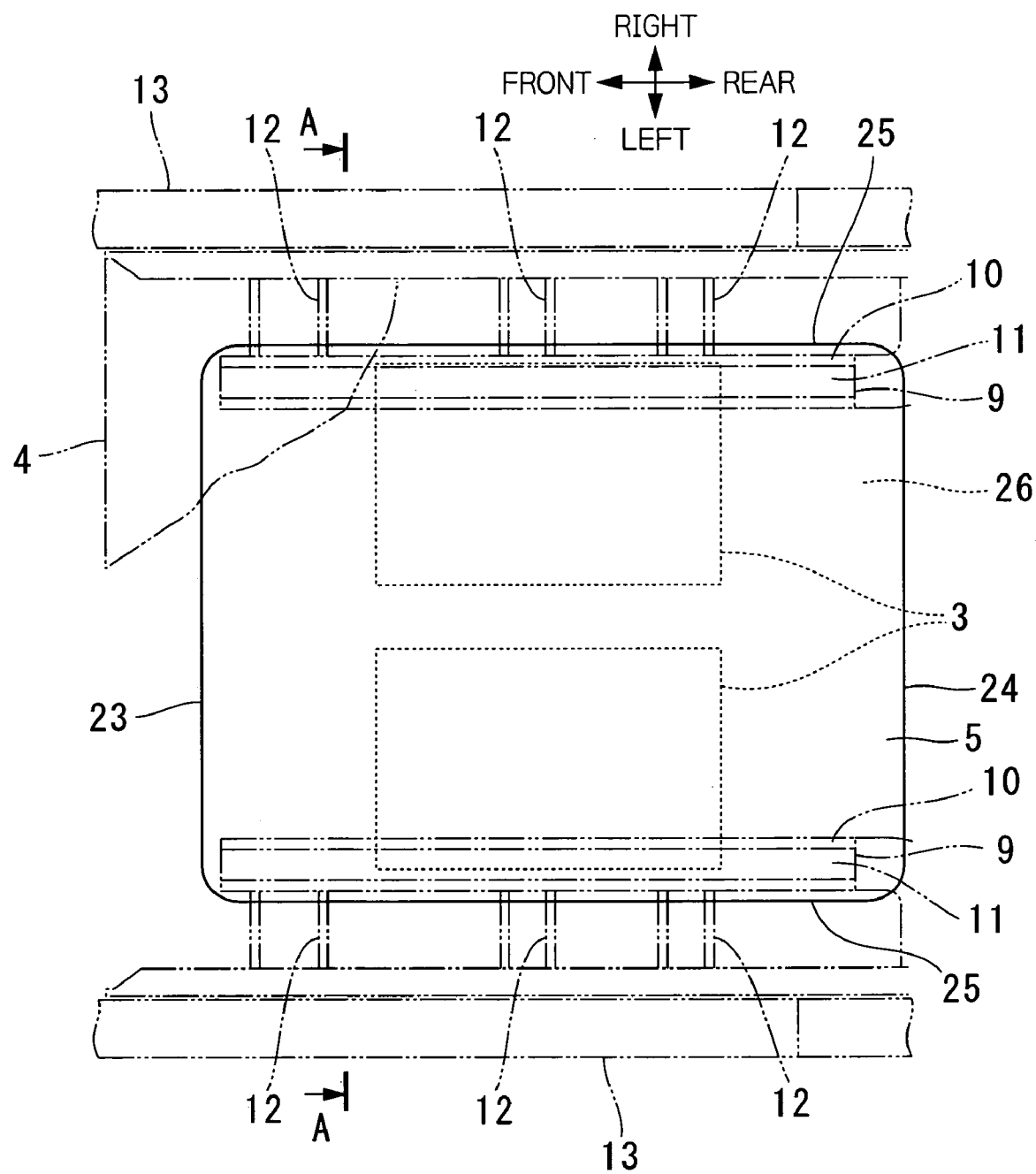
FIG. 2 is a plan explanatory view of essential parts of the fuel cell vehicle of an embodiment of the invention.
Figure 3:
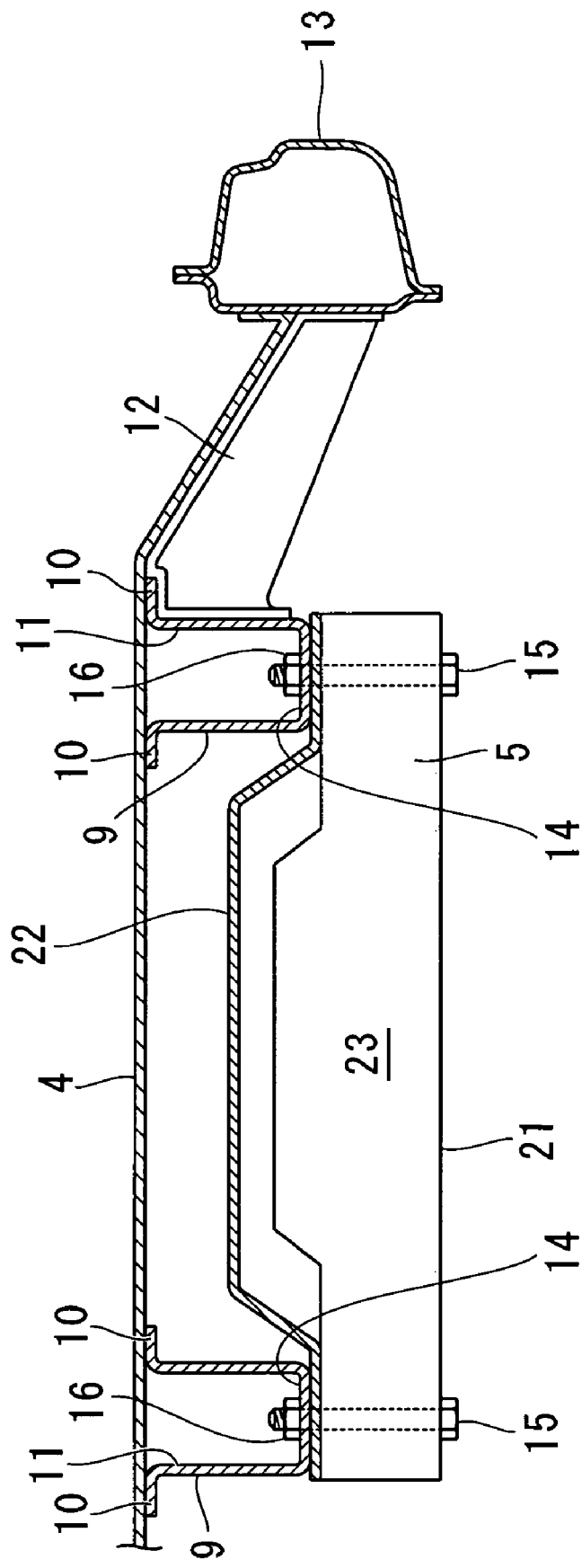
FIG. 3 is a sectional view along line A-A of FIG. 2.

As shown in FIG. 2 and FIG. 3, the main frames 9 with a hat-like sectional form are joined via the flanges 10 to both the left and right sides of the bottom face of the front floor 4. The carbody skeleton 11 is formed in the longitudinal direction of the carbody with the main frames 9 and front floor 4. Outriggers 12 of hat-like sectional form extending in the widthwise direction of the vehicle are joined in three places to the outer side wall of the main frames 9, and the outer ends of the outriggers 12 are joined to the side sills 13. As with the main frames 9, the outriggers 12 are joined to the bottom face of the front floor 4. The fuel cell system box 5 is fastened and fixed by the bolts 15 and nuts 16 to the bottom walls 14 of the main frames 9. The front-back-left-right directional arrows in FIG. 2 show the respective front-back-left-right directions of the carbody.

The main frames 9 and side sills 13 are connected via the back ends of the side sills to the lateral rear frame 17 (see FIG. 1) provided at the rear of the carbody in the longitudinal direction. As shown in FIG. 1, a sub-frame 18 provided with rear suspension (not illustrated) is attached from underneath to the rear frame 17. The hydrogen tanks 19 and 20 are respectively fixed in a crosswise manner to the front side and rear side of the sub-frame 18.

Figure 4:
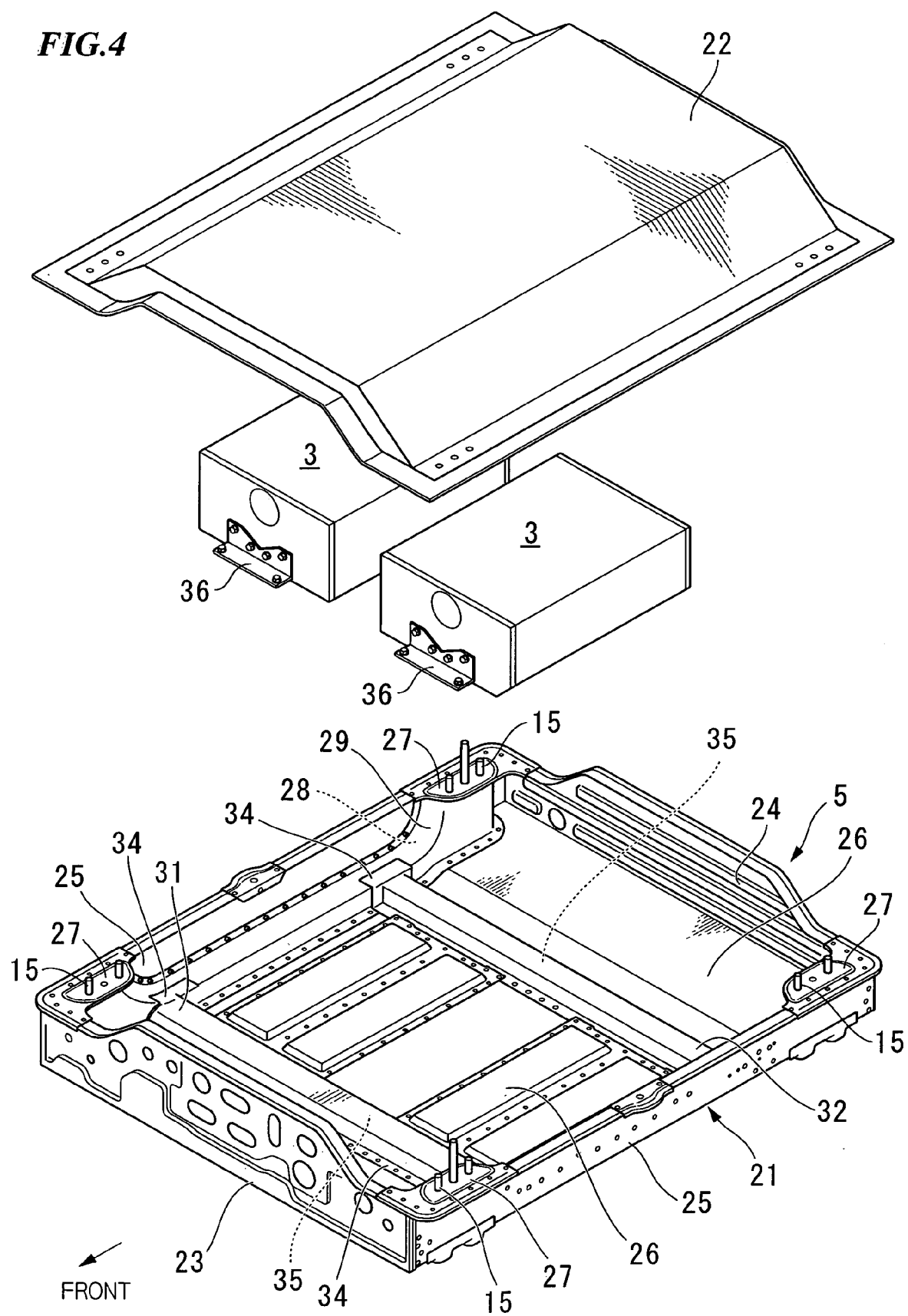
FIG. 4 is an exploded perspective view of the fuel cell system box of an embodiment of the invention.

As shown in FIG. 4, the fuel cell system box 5 that houses the fuel cells 3 and has the rectangular box-shaped box body 21 and the lid 22 that covers the box body 21 from above.

The box body 21 includes the front wall (first side wall) 23 consisting of iron material, the rear wall (first side wall) 24 consisting of iron material, the two side walls (second side walls, other walls) 25 consisting of aluminum material, and the bottom wall (other wall) 26 consisting of aluminum material. The iron material has a specific gravity that is greater than that of the aluminum material. The attachment brackets 27 of the main frames 9 are attached to the front upper edges and rear upper edges of the side walls 25. The side reinforcements 29 that form the skeletal part 28 are attached between the side walls 25 and the bottom wall 26.

The front stack frame 31 and rear stack frame 32 are joined to the bottom wall 26 of the box body 21 between each side reinforcement 29 in the widthwise direction of the vehicle. The front stack frame 31 is attached slightly to the rear of the forward end of the box body 21, while the rear stack frame 32 is attached slightly to the front of the back end of the box body 21. The attachment brackets 27, front stack frame 31 and rear stack frame 32 are consisted of aluminum material.

The front stack frame 31 and rear stack frame 32 have a hat-like sectional form. A skeletal part 35 of closed sectional structure is formed on the top face of the bottom wall 26 of the box body 21 by welding each peripheral flange 34 of the front stack frame 31 and rear stack frame 32 to the top face of the bottom wall 26 of the box body 21 and to the side reinforcements 29.

The fuel cells 3, which are separated into right and left and electrically connected in a serial manner, are respectively fixed via the brackets 36 between the front stack frame 31 and rear stack frame 32.

Figure 5:
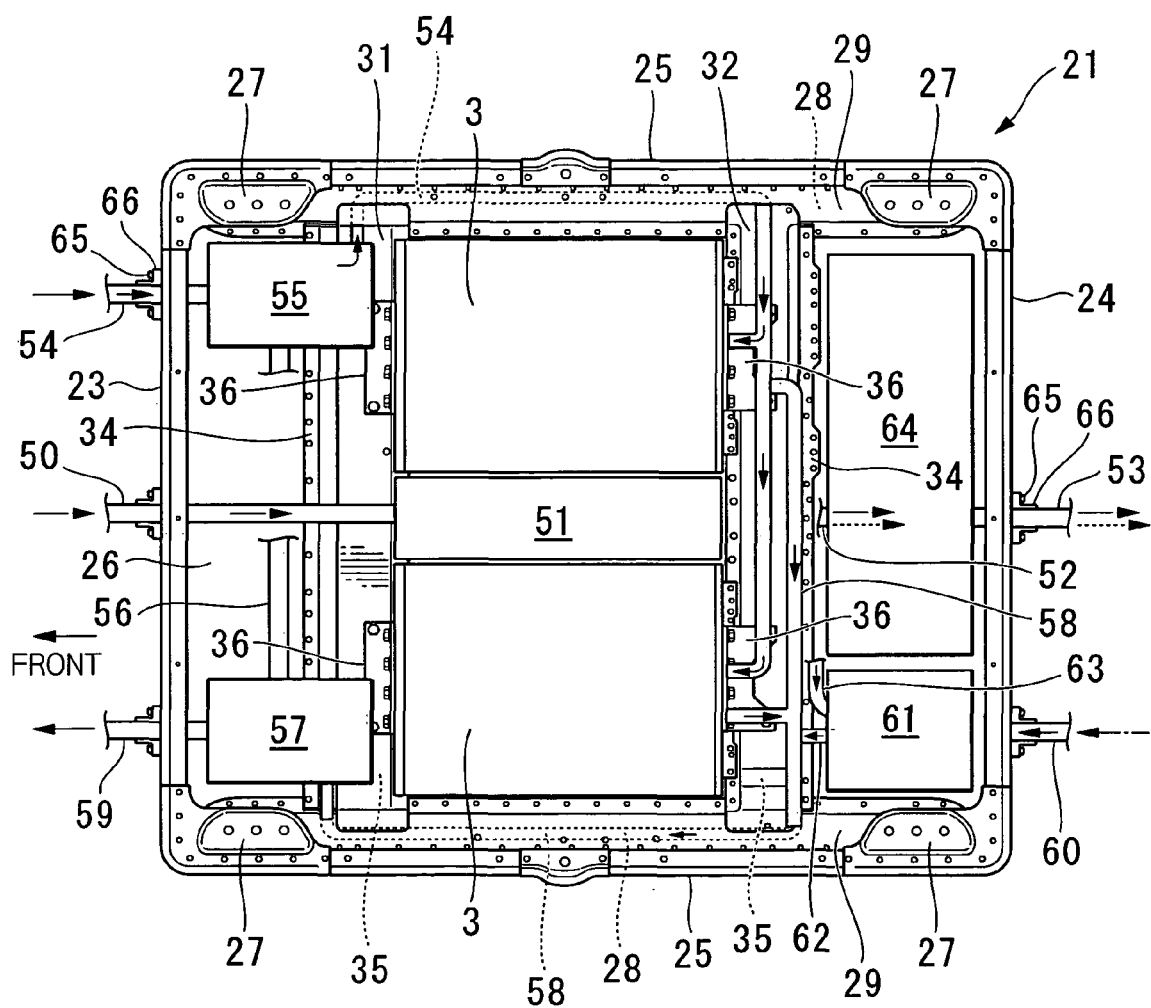
FIG. 5 is a plan view showing the state of connection of hydraulic pipes of the fuel cell system box of an embodiment of the invention.

FIG. 5 shows a typical view of accessories of the fuel cells 3 in a state where the fuel cells 3 are installed. Flow-through pipes for supply and discharge of the air, hydrogen gas and coolant of the fuel cells 3 are connected to the fuel cells 3 in the aforementioned manner. These flow-through pipes pass through the front wall 23 and rear wall 24, and connect to the fuel cells 3 and to the accessories explained below.

Specifically, the air supply pipe (hydraulic pipe) 50 that supplies air to the fuel cells 3 is provided so as to transit the part of the front wall 23 that is substantially at the center in the widthwise direction of the vehicle. The air supply pipe 50 is connected to the humidifier 51 arranged between the fuel cells 3. The humidifier 51 serves to supply the reaction gas to the fuel cells 3 in a state where the reaction gas have been moistened by using the exhaust gas moisture, and to optimally maintain the ion exchange function of the solid polymer electrolyte membrane. The air discharge pipe 52 connected to the fuel cells 3 transits the part of the rear wall 24 of the fuel cells 3 that is substantially at the center in the widthwise direction of the vehicle via the dilution box 64 arranged at the rear of the fuel cells 3, and connects to the exhaust pipe (hydraulic pipe) 53.

The coolant supply pipe (hydraulic pipe) 54 that is connected to the radiator (not illustrated) arranged at the front of the carbody is configured so as to pass through the part of the front wall 23 that is on the right side in the widthwise direction of the vehicle. The coolant supply pipe 54 is connected to a wax pellet type thermostat 55 arranged to the front of the fuel cells 3 on the right. The coolant cools both the fuel cells 3 and the high voltage electrical parts such as the power supply system of the fuel cells 3, and heat discharge is conducted by the radiator.

As the thermostat 55 gives priority to activating the fuel cells 3 when warm-up operation is conducted, the coolant supply pipe 54 with respect to the radiator is closed, and the communicating pipe 56 with respect to the below-mentioned water pump 57 is opened. The coolant supply pipe 54 disposed front of the thermostat 55 along the coolant flow is routed toward the back along the inner side of the side wall 25 on the right side of the fuel cell system box 5, and connects to the back end of each fuel cell 3. The coolant return pipe 58, which connects to the back end of each fuel cell 3 via the cooling channels inside the fuel cells 3, is routed this time toward the front along the inner side of the side wall 25 on the left side of the fuel cell system box 5. Furthermore, the coolant return pipe 58 connects to the water pump 57 for coolant supply arranged to the front of the fuel cells 3 on the left, where it becomes the coolant discharge pipe (hydraulic pipe) 59, and passes through the front wall 23, and is routed toward the radiator (not shown).

The hydrogen supply pipe (hydraulic pipe) 60 for hydrogen gas connected to the hydrogen tanks 19 and 20 is configured so as to pass through the part of the rear wall 24 on the left side in the widthwise direction of the vehicle. The hydrogen supply pipe 60 is connected to the hydrogen circulation system 61 arranged at the back of the fuel cells 3 on the left. The hydrogen circulation system 61 supplies hydrogen gas to the fuel cells 3 from the supply pipe 62, and returns unreacted hydrogen gas discharged from the fuel cells via the circulation pipe 63, where it is recirculated. The hydrogen discharge pipe (not shown) of the hydrogen gas provided for power generation inside the fuel cells 3 is connected to the dilution box 64.

The air supply pipe 50, exhaust pipe 53, coolant supply pipe 54, coolant discharge pipe 59, and hydrogen supply pipe 60 pass through the front wall 23 and rear wall 24 of the fuel cell system box 5 in the aforementioned manner, and these are supported in the front wall 23 and rear wall 24 of the fuel cell system box 5 via brackets 66 fixed in place by bolts 65. The front wall 23 and rear wall 24 are both consisted of iron material which has greater weight per unit volume and better support rigidity compared to the aluminum material that forms both side walls 25 and 25 and the bottom wall 26 or the members other than these.

Moreover, the front wall 23 and rear wall 24 are provided with a cationic electrodeposition coating, and are joined and fixed in the state by rivets 67 to both side walls 25, the bottom wall 26 or other members.

Figure 6:
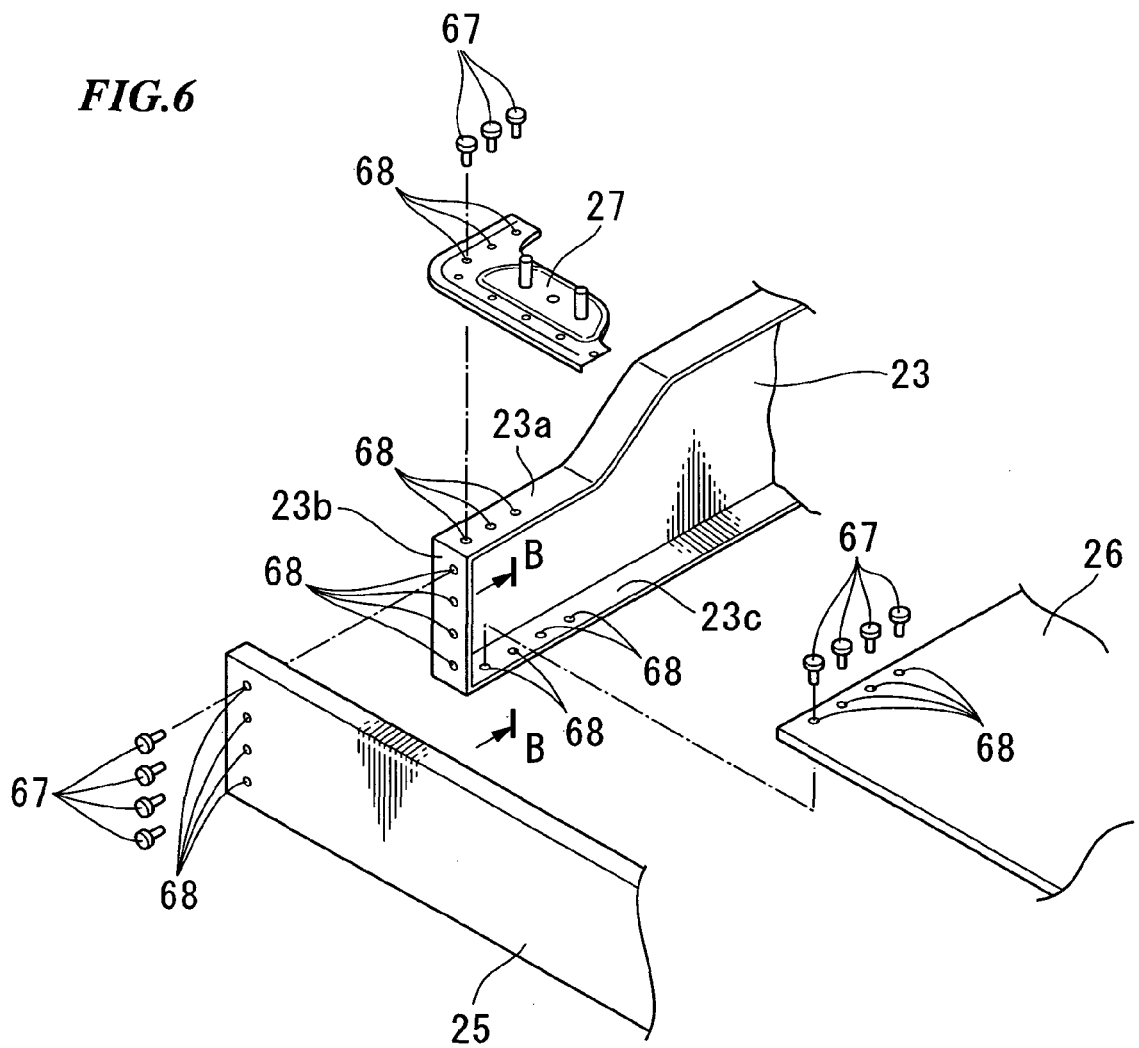
FIG. 6 is an exploded perspective view of the riveted parts of an embodiment of the invention.
Figure 7:
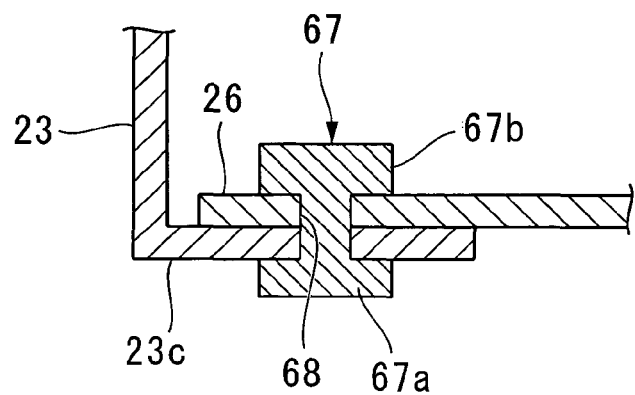
FIG. 7 is a plan view along line B-B of FIG. 6.

When the front wall 23 is shown as a specific example in FIG. 6, the front wall 23 is provided with the upper edge flange 23a, the side edge flange 23b and lower flange 23c, which respectively extend toward the interior. The lower edge flange 23c is overlaid from above by the bottom wall, the side edge flange 23b is overlaid from the outside by the side wall 25, and the corner of the outer side of the upper edge flange 23a in the widthwise direction of the vehicle is overlaid from above by the attachment bracket 27. As shown in FIG. 7, the side wall 25, bottom wall 26 and attachment bracket 27 are joined and fixed by the rivets 67 that are inserted through the attachment holes 68. In FIG. 7, 67a is the head of the rivet 67, and 67b is the caulking part of the rivet 67. As the rear wall 24 is joined to the side walls 25 and bottom wall 26 in the same configuration as the front wall 23, an explanation thereof is omitted.

In the aforementioned first embodiment, the front wall 23 and rear wall 24 of the fuel cell system box 5 are constituted of iron material with better support rigidity than the side walls 25 and bottom wall 26 constituted of aluminum material, with the result that it is possible to increase the support rigidity of the air supply pipe 50, exhaust pipe 53, coolant supply pipe 54, coolant discharge pipe 59 and hydrogen supply pipe 60, which are supported via the bracket 66 as they pass through the front wall 23 and rear wall 24. Accordingly, it is possible to prevent the vibration transmitted from the air supply pipe 50, exhaust pipe 53, coolant supply pipe 54, coolant discharge pipe 59 and hydrogen supply pipe 60 from being transmitted to the entirety of the fuel cell system box 5. Consequently, it is possible to protect the fuel cell 3 from vibration, and to enhance quiet.

In the aforementioned first embodiment, the side walls 25, bottom wall 26 and other members apart from the front wall 23 and rear wall 24 are constituted of aluminum material, with the result that it is possible to plan the entirety of the fuel cell system box to be more lightweight, and, thus, to plan a more lightweight carbody and contribute to improved fuel consumption.

In the aforementioned first embodiment, the front wall 23 and rear wall 24 constituted of iron material are joined, in a state where they have received a cationic electrodeposition coating, to the side walls 25, bottom wall 26 or other members such as the attachment brackets 27 constituted of aluminum material by the rivets 67, with the result that it is possible to prevent direct mutual contact of the iron material and aluminum material. Consequently, it is possible to prevent local current corrosion—that is, electrocorrosion—due to formation of a local battery from the electric potential difference produced when two different types of metal come into contact In the first embodiment, an explanation was made for the case where hydraulic pipes pass through, for example, the front wall 23 and rear wall 24, but it is also acceptable to make the side walls 25 and 25 from iron material, and have the hydraulic pipes pass through there.

Next, a second embodiment of the invention is explained based on drawings. Explanation is made with regard to the fuel cell system box 5 in particular, and the remaining configuration is identical to that of the first embodiment.

Figure 8:
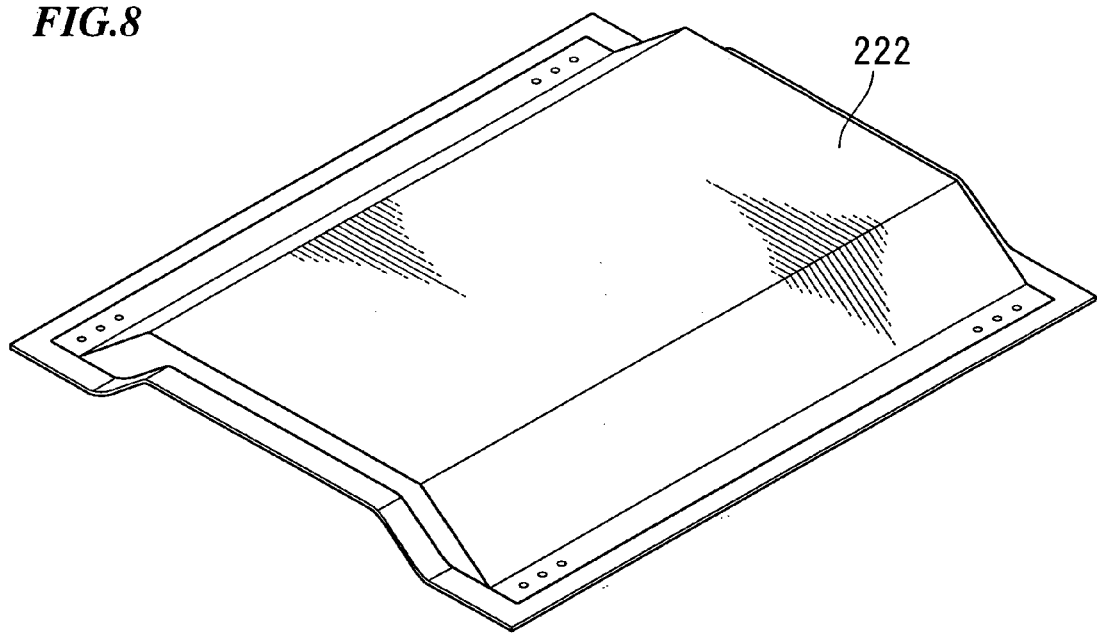
FIG. 8 is an exploded perspective view of the fuel cell system box of a second embodiment.
Figure 8:
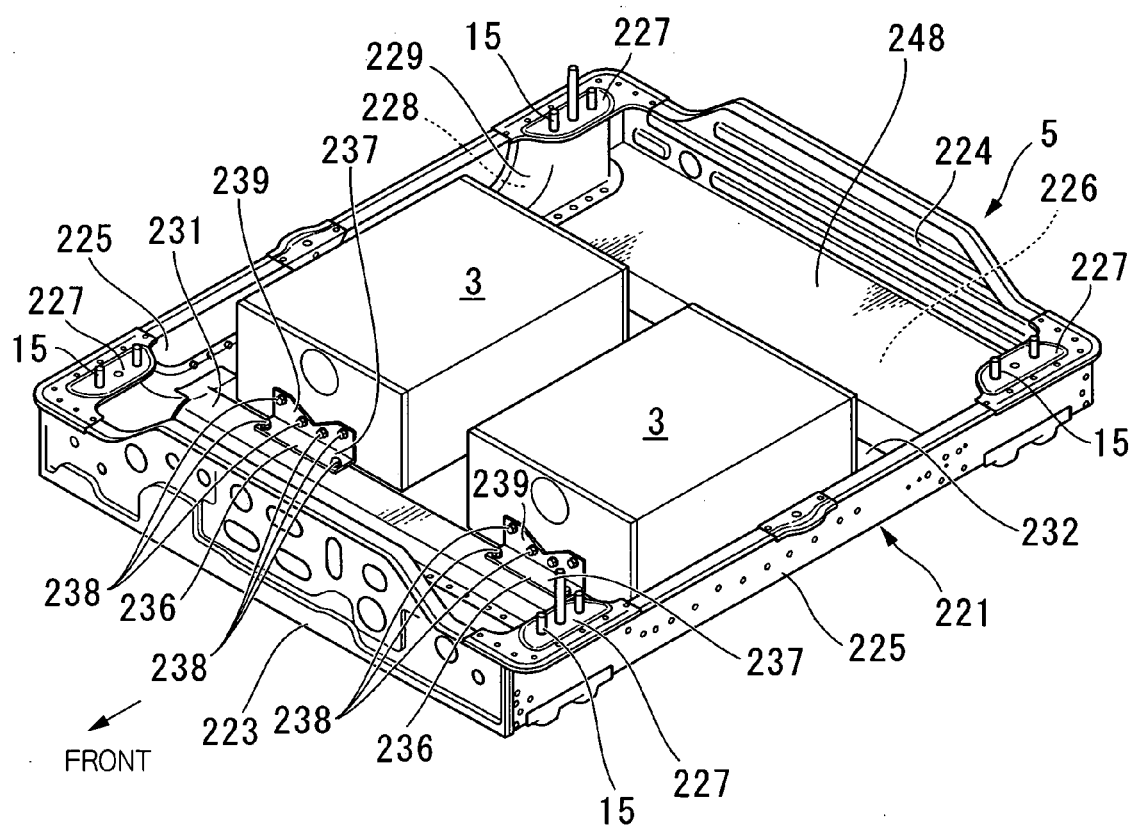
Figure 9:
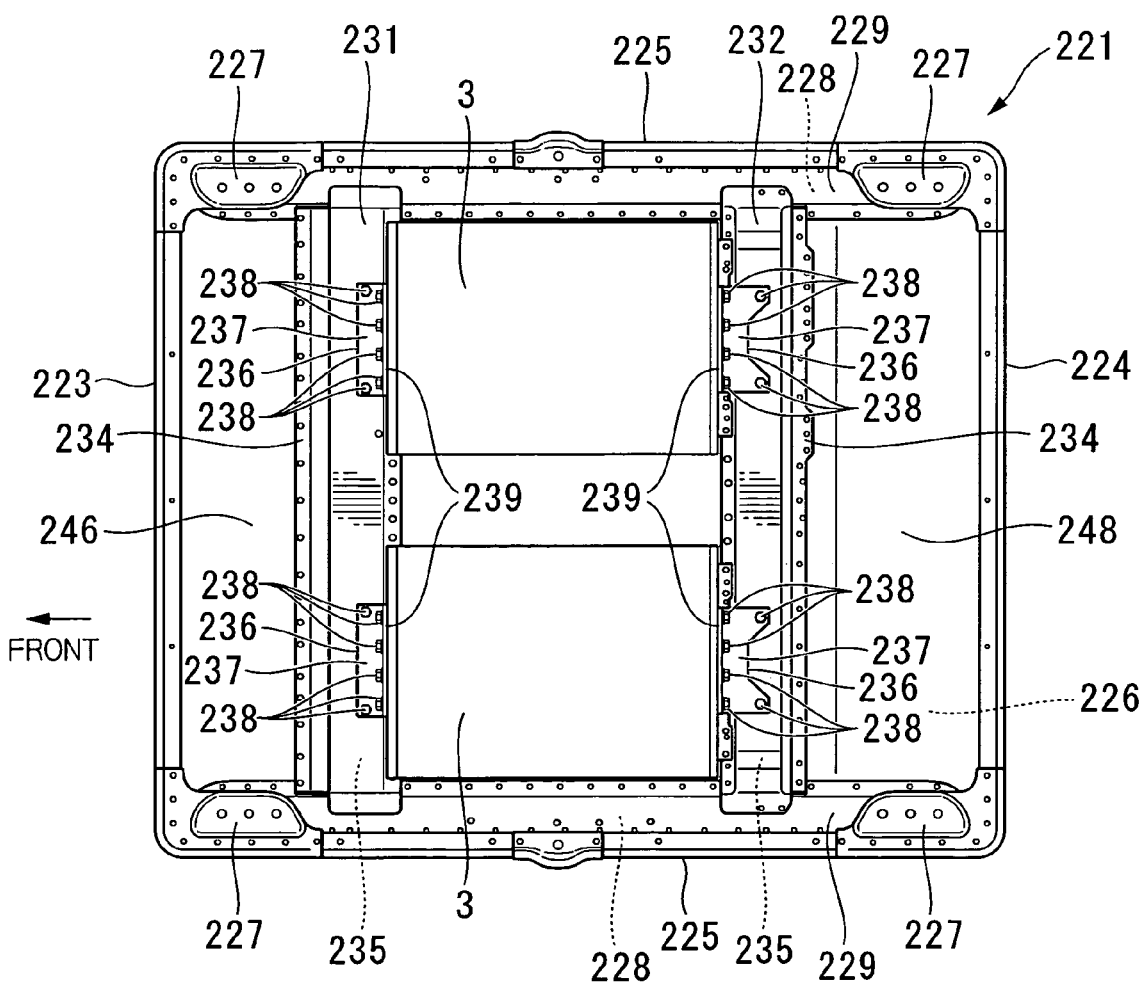
FIG. 9 is a plan view of the box body installing the fuel cells of the second embodiment.
Figure 10:
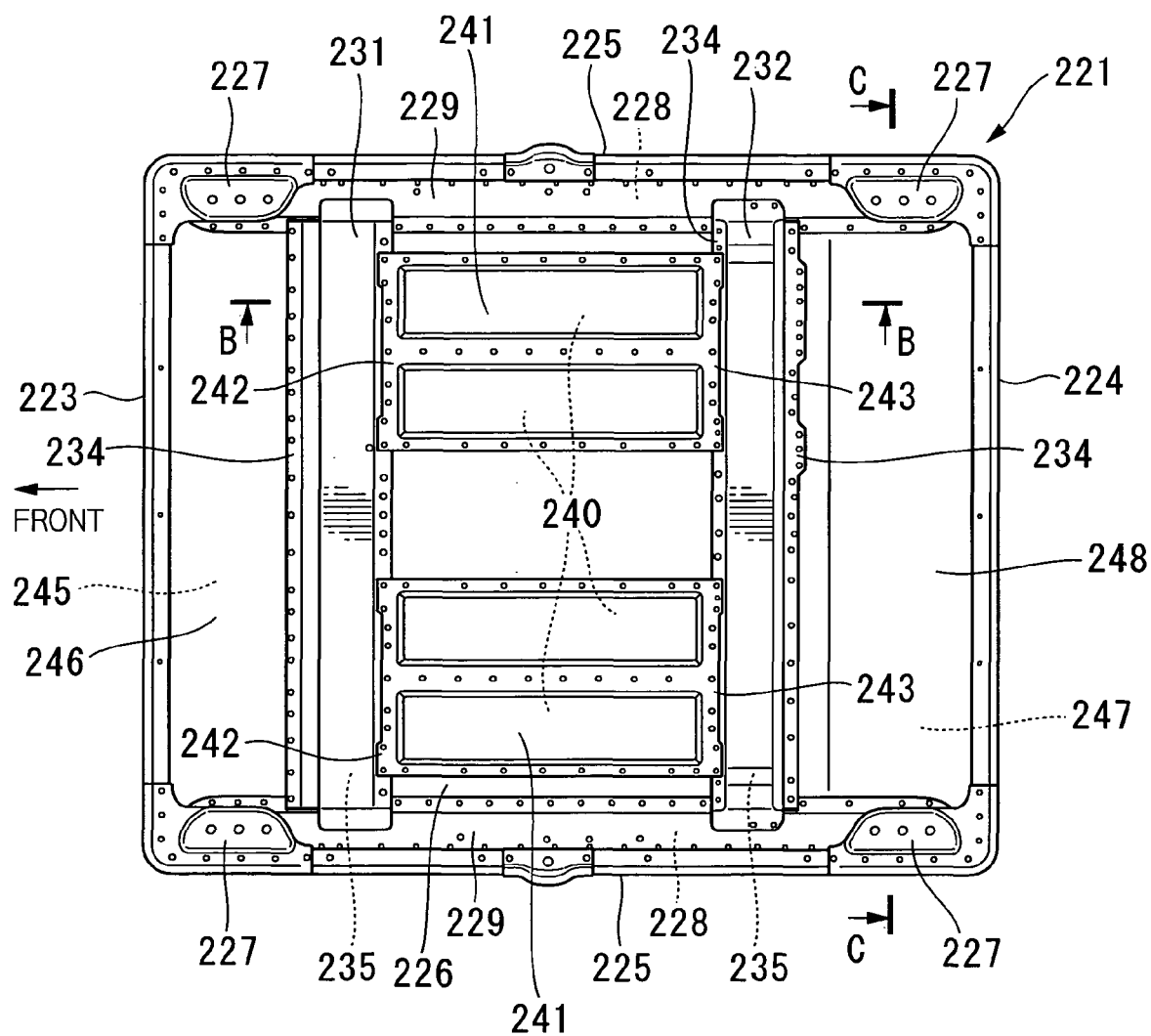
FIG. 10 is a plan view of the box body of the second embodiment.
Figure 11:
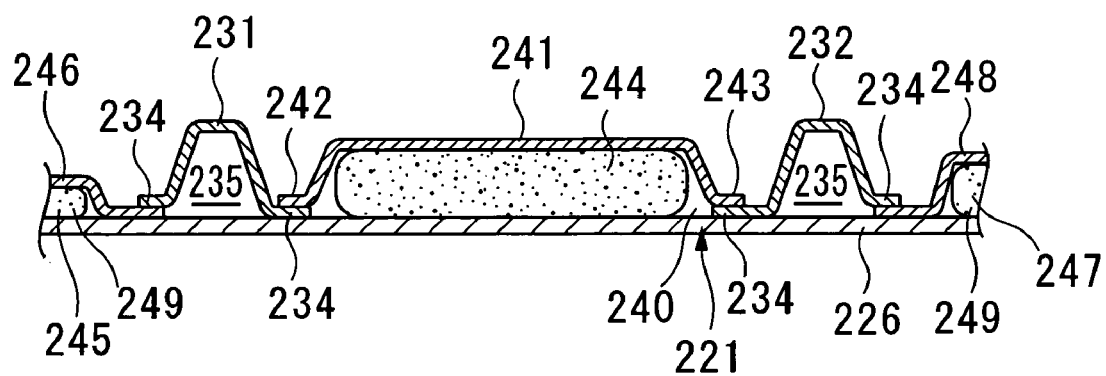
FIG. 11 is a plan view along line B-B of FIG. 10.
Figure 12:
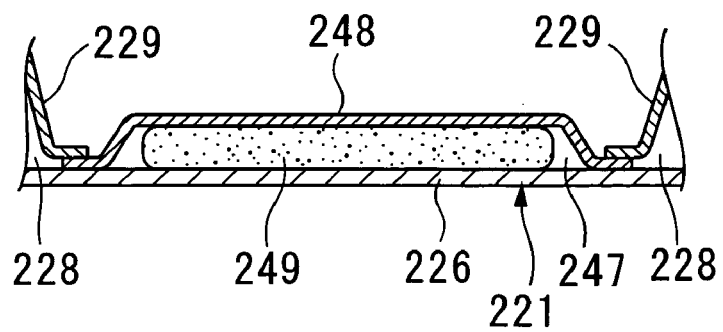
FIG. 12 is a plan view along line C-C of FIG. 10.

As shown in FIGS. 8 to 10, the fuel cell system box 5 that houses the fuel cells 3 is configured from the rectangular box-shaped box body 221 and the lid 222 covering the box body 221 from above.

The box body 221 includes the front wall 223 (first side wall), the rear wall 224 (first side wall), the two side walls 225, and the bottom wall (bottom face) 226. The attachment brackets 227 for the main frames 9 are attached to the front upper edges and rear upper edges of the side walls 225. The side reinforcements 229 that form the skeletal part 228 are attached between the side walls 225 and the bottom wall 226.

The front stack frame (skeletal member) 231 and rear stack frame (skeletal member) 232 are joined to the bottom wall 226 of the box body 221 between each side reinforcement 229 in the widthwise direction of the vehicle. The front stack frame 231 is attached slightly to the rear of the forward end of the box body 221, while the rear stack frame 232 is attached slightly to the front of the back end of the box body 221.

The front stack frame 231 and rear stack frame 232 have a hat-like sectional form. A skeletal part 235 of closed sectional structure is formed on the top face of the bottom wall 226 of the box body 221 by welding each peripheral flange 234 of the front stack frame 231 and rear stack frame 232 to the top face of the bottom wall 226 of the box body 221 and to the side reinforcements 229. The fuel cells 3 and 3, which are divided in two and electrically connected in a serial manner are respectively fixed via the brackets 236 between the front stack frame 231 and rear stack frame 232. These brackets 236 have an L-shaped sectional form, and the bottom wall 237 of the bracket 236 is fixed to the top face of the front stack frame 231 or rear stack frame 232 by the bolts 238, while the vertical wall 239 of the bracket 236 is fixed in place by the bolts 238 to the front end vertical wall or back end vertical wall of the fuel cells 3.

As shown in FIGS. 6 to 8, between the front stack frame 231 and rear stack frame 232, crosswise pairs of sandwich panels (plates) 241 are attached to the underside of the placement areas of the front and rear stack frames 231 and 232, that is, to areas that respectively correspond to the bottom face of each fuel cell 3. These sandwich panels 241 form the space 240 with the top face of the bottom wall 226 of the box body 221. With regard to these sandwich panels 241, the front flange 242 is joined to the rear edge of the peripheral flange 234 of the front stack frame 231, and the rear flange 243 is joined to the front edge of the rear stack frame 232. The space 240 formed between the sandwich panel 241 and the bottom wall of the box body 221 is filled with anti-vibration material 244 consisting of, for example, foam rubber.

The central part of the sandwich panel 241 in the widthwise direction of the vehicle is fixed to the bottom wall 226 of the box body 221, with the result that two spaces 240 are formed in one sandwich panel, with anti-vibration material 244 inserted in each space 240.

The front cover member 246 that forms the space 245 with the bottom wall 226 of the box body 221 is attached to the front stack frame 231, while the rear cover member 248 that forms the space 247 with the bottom wall 226 of the box body 221 is attached to the rear stack frame 232. Vibration-proof material 249 consisting of foam resin or the like is also packed into each space 245 and 247. The front cover member 246 and rear cover member 248 are lower in height than the top face of the sandwich panels 241, and the accessories of the fuel cells 3 are arranged on the top of the front cover member 246 and rear cover member 248.

In the aforementioned second embodiment, the fuel cells 3 are supported by the front stack frame 231 and rear stack frame 232 provided in the widthwise direction of the vehicle on the bottom wall 226 of the box body 221 such that the fuel cells 3 are straddled by the side reinforcements 229. Accordingly, the fuel cells 3 are supported by the skeletal part 228 formed by the side reinforcements 229 in the longitudinal direction of the vehicle and by the skeletal part 235 formed by the front stack frame 231 and rear stack frame 232. Consequently, it is possible to reliably and stably fix the fuel cells 3 to the fuel cell system box 5.

With the aforementioned second embodiment, the sandwich panels 241 are connected so as to be straddled by the front stack frame 231 and rear stack frame 232 underneath the fuel cells 3, the spaces 240 are formed between the sandwich panels 241 and the bottom wall 226 of the box body 221, and these spaces 240 are filled with the anti-vibration material 244. Consequently, even if the bottom wall 226 of the box body 221 positioned under the fuel cells 3 vibrates, this vibration is absorbed by the anti-vibration material 244, with the result that transmission of this vibration to the fuel cells 3 can be prevented. Consequently, it is possible to protect the fuel cells 3 from vibration, and to enhance quiet in the vehicle compartment.

With the aforementioned second embodiment, the anti-vibration material 244 is covered by the sandwich panel 241 fixed to the front stack frame 231 and rear stack frame 232, with the result that the support rigidity of the sandwich panel 241 is increased, surface vibration of the sandwich panel 241 can also be suppressed, and quiet can be enhanced with this point as well.

With the aforementioned second embodiment, anti-vibration material 249 is packed into the space 245 formed between the front cover member 246 and the bottom wall 226 of the box body 221 at the front of the front stack frame 231, and anti-vibration material 249 is packed into the space 247 formed between the rear cover member 248 and the bottom wall 226 of the box body 221 at the back of the rear stack frame 232. Consequently, it is also possible to reliably suppress surface vibration of the bottom wall 226 of the box body 221 in these parts as well, with the result that quiet in the vehicle compartment can be further enhanced. As the transmission of vibration to the accessories arranged above the front cover member 246 and rear cover member 248 is prevented, these can be protected from vibration.

Next, a third embodiment of the invention is explained based on drawings. Explanation is made with regard to the fuel cell system box 5 in particular; the remaining configuration is identical to that of the first embodiment.

Figure 13:
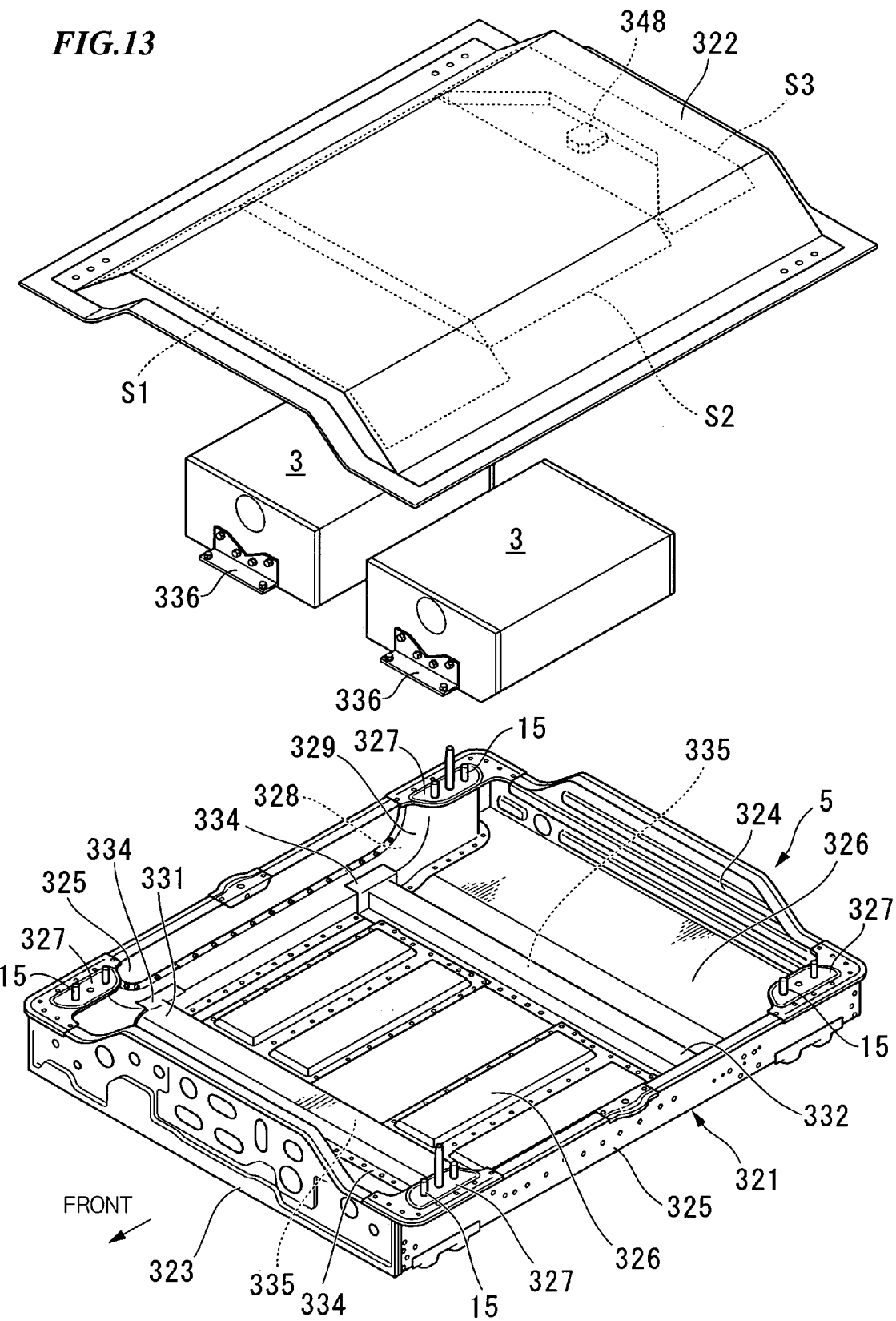
FIG. 13 is an exploded perspective view of the fuel cell system box of a third embodiment.

As shown in FIG. 13, the fuel cell system box 5 that houses the fuel cells 3 is configured from the rectangular box-shaped box body 321 and the lid 322 covering the box body 321 from above.

The box body 321 is formed in a box shape (vessel shape) and includes the front wall 323 (first side wall), the rear wall 324 (first side wall), the two side walls 325 and 325, and the bottom wall (bottom face) 226. The attachment brackets 327 for the main frames 9 are attached to the front upper edges and rear upper edges of the side walls 325. The side reinforcements 329 that form the skeletal part 328 are attached between the side walls 325 and the bottom wall 326. The front stack frame 331 and rear stack frame 332 are joined to the bottom wall 326 between each side reinforcement 329 in the widthwise direction of the vehicle. The front stack frame 331 is attached slightly to the rear of the forward end of the box body 321, while the rear stack frame 332 is attached slightly to the front of the back end of the box body 321.

The front stack frame 331 and rear stack frame 332 have a hat-like sectional form. A skeletal part 335 of closed sectional structure is formed on the top face of the bottom wall 326 of the box body 321 by welding each peripheral flange 334 of the front stack frame 331 and rear stack frame 332 to the top face of the bottom wall 326 of the box body 321 and to the side reinforcements 329.

The fuel cells 3 and 3, which are divided in two and electrically connected in a serial manner are respectively fixed via the brackets 336 between the front stack frame 331 and rear stack frame 332.

Figure 14:
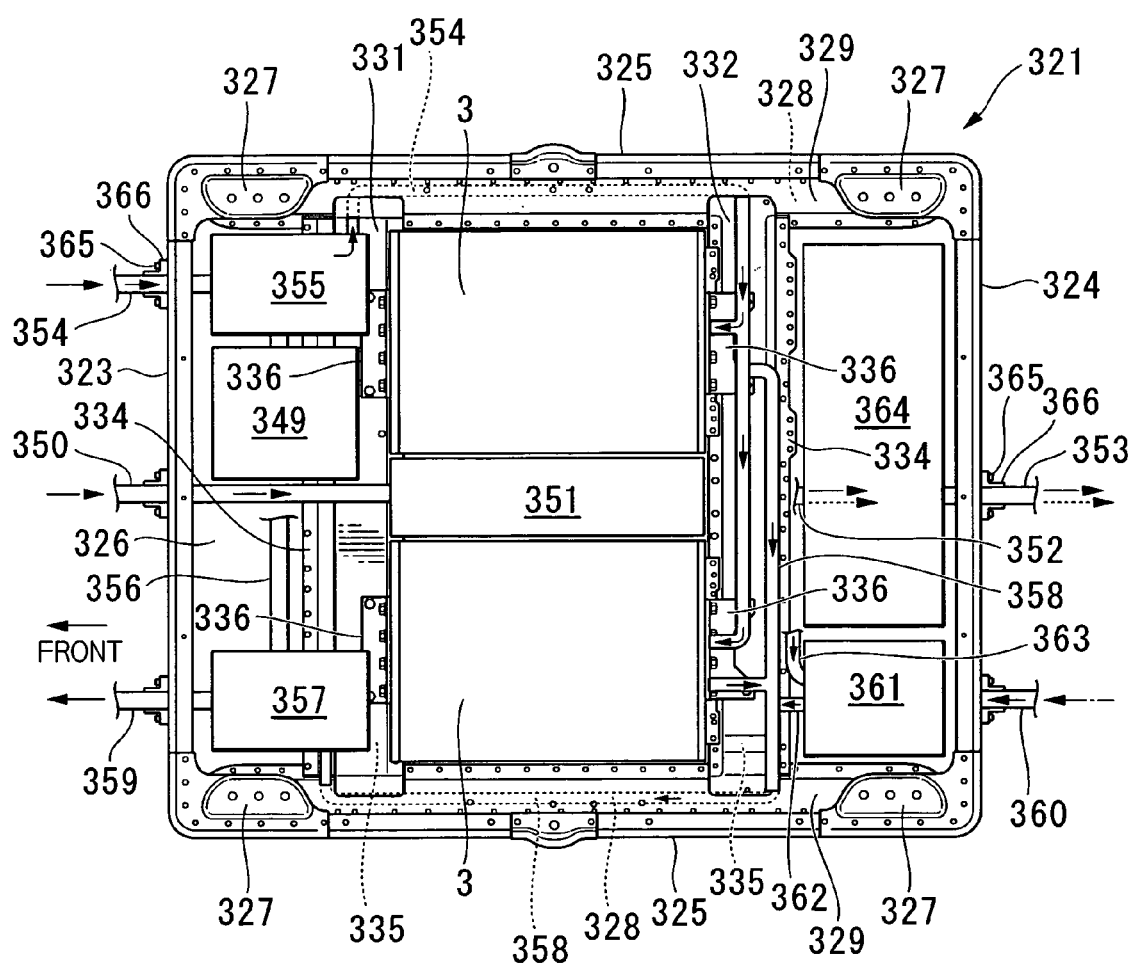
FIG. 14 is a plan view showing the state of connection of hydraulic pipes of the fuel cell system box of the third embodiment.

FIG. 14 shows a typical view of accessories of the fuel cells 3 in a state where the fuel cells 3 are installed.

Flow-through pipes for supply and discharge of the air, hydrogen gas and coolant of the fuel cells 3 are connected to the fuel cells 3 in the aforementioned manner. These flow-through pipes pass through the front wall 323 and rear wall 324, and connect to the fuel cells 3 and to the accessories explained below.

Specifically, the air supply pipe 350 that supplies air to the fuel cells 3 is provided so as to transit the part of the front wall 323 that is substantially at the center in the widthwise direction of the vehicle. The air supply pipe 350 is connected to the humidifier 351 arranged between the fuel cells 3. The humidifier 351 serves to supply the reaction gas to the fuel cells in a state where the reaction gas have been moistened by using the exhaust gas moisture, and to optimally maintain the ion exchange function of the solid polymer electrolyte membrane. The air discharge pipe 352 connected to the fuel cells 3 transits the part of the rear wall 324 of the fuel cells 3 that is substantially at the center in the widthwise direction of the vehicle via the dilution box 364 arranged at the rear of the fuel cells 3, and connects to the exhaust pipe 353.

The coolant supply pipe 354 that is connected to the radiator (not illustrated) arranged at the front of the carbody is configured so as to transit the part of the front wall 323 that is on the right side in the widthwise direction of the vehicle. The coolant supply pipe 354 is connected to a wax pellet type thermostat 355 arranged to the front of the fuel cells 3 on the right. The coolant cools both the fuel cells 3 and the high voltage electrical parts such as the power supply system of the fuel cells 3, and heat discharge is conducted by the radiator.

As the thermostat 355 gives priority to activating the fuel cells 3 when warm-up operation is conducted, the coolant supply pipe 354 with respect to the radiator is closed, and the communicating pipe 356 with respect to the below-mentioned water pump 357 is opened. The coolant supply pipe 354 disposed front of the thermostat 355 is routed toward the back along the inner side of the side wall 325 on the right side of the fuel cell system box 5, and connects to the back end of each fuel cell 3. The contact box 349 that houses the contacts which constitute the electromagnetic make-and-break switch is arranged to the side of the thermostat 355.

The coolant return pipe 358, which connects to the back end of each fuel cell 3 via the cooling channels inside the fuel cells 3, is routed this time toward the front along the inner side of the side wall 325 on the left side of the fuel cell system box 5. Furthermore, the coolant return pipe 358 connects to the water pump 357 for coolant supply arranged to the front of the fuel cells 3 on the left, where it becomes the coolant discharge pipe 359, and passes through the front wall 323, and is routed toward the radiator.

The hydrogen supply pipe 360 for hydrogen gas connected to the hydrogen tanks 19 and 20 is configured so as to pass through the part of the rear wall 324 on the left side in the widthwise direction of the vehicle. The hydrogen supply pipe 360 is connected to the hydrogen circulation system (hydrogen system accessories) 361 arranged at the back of the fuel cells 3 on the left. The hydrogen circulation system 361 supplies hydrogen gas to the fuel cells 3 from the supply pipe 362, and returns unreacted hydrogen gas discharged from the fuel cells via the circulation pipe 363 by the hydrogen pump and ejector (not shown), where it is recirculated. The hydrogen discharge pipe (not shown) of the hydrogen gas provided for power generation inside the fuel cells 3 is connected to the dilution box 364.

The air supply pipe 350, exhaust pipe 353, coolant supply pipe 354, coolant discharge pipe 359, and hydrogen supply pipe 360 passes through the front wall 323 and rear wall 324 of the fuel cell system box 5 in the aforementioned manner, and these are supported in the front wall 323 and rear wall 324 of the fuel cell system box 5 via brackets 366 fixed in place by bolts 365.

Figure 15:
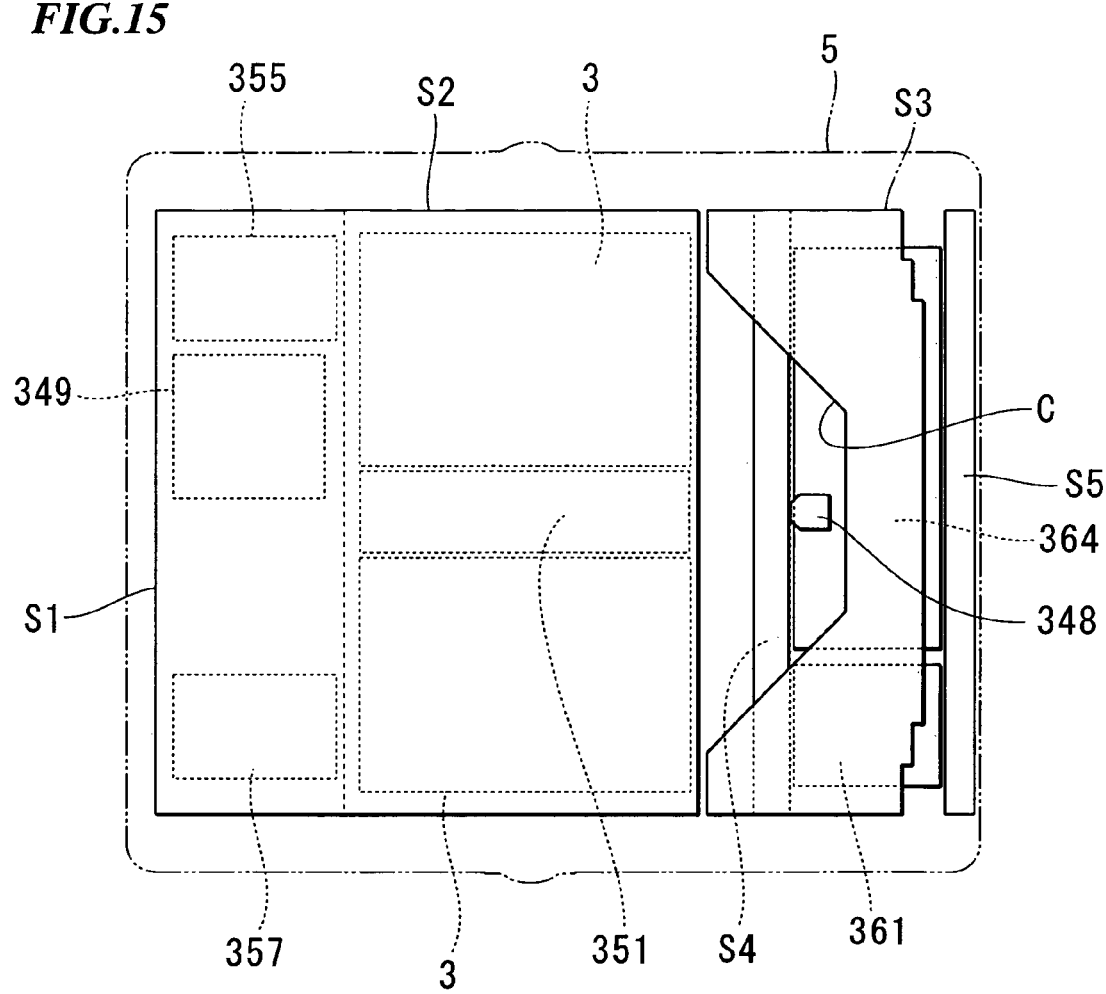
FIG. 15 is a schematic plan view showing the arrangement of spacers in the third embodiment.
Figure 16:
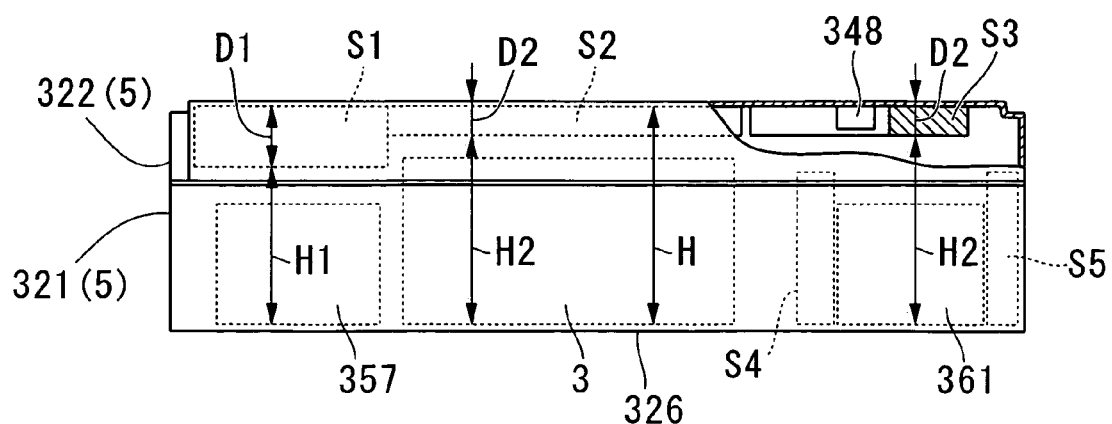
FIG. 16 is a lateral view of FIG. 15.

As shown in a typical representation by FIG. 15 and FIG. 16, the first to the third height adjusting spacers S1-S3 are provided in the lid 322 that constitutes the top wall of the fuel cell system box 5. These first to third spacers S1-S3 are attached to the rear face of the lid 322, and form height variations on the bottom face of the lid 322. That is, the height of the ceiling of the fuel cell system box 5 varies according to the thickness of the first to third spacers S1-S3 attached to the bottom face of the lid 322. The lid 322 has a chevron sectional form in the widthwise direction where the central part in the widthwise direction is elevated more than the side parts.

To explain with specificity, the resin first spacer S1 with thickness D1 (the height of its bottom face from the bottom wall 326 is H1) is attached to the rear face of the lid 322 extending in the widthwise direction of the fuel cell system box 5 above the thermostat 355, contact box 349 and water pump 357 which are the accessories farther toward the front than the fuel cells 3. The second spacer S2 with thickness D2 (the height of its bottom face from the bottom wall 326 is H2 (H2>H1)) is attached to the bottom face of the lid 322 extending in the widthwise direction of the fuel cell system box 5 above the fuel cells 3 and the humidifier 351. The thickness D1 is set larger than thickness D2, and the bottom face height of the lid 322 is set to H (H>H2).

The third spacer S3 made of resin or the like with thickness D2 (the height of its bottom face from the bottom wall 326 is H2) is attached to the rear face of the lid 322 extending in the widthwise direction of the fuel cell system box 5 above the dilution box 364 and hydrogen circulation system 361 which are the accessories farther toward the back than the fuel cells 3.

The third spacer S3 is provided with the notch C where the vicinity of the rear end of the fuel cells 3 and humidifier 351 is excised in a substantially trapezoidal shape when viewed in a planar manner. At the notch C, the bottom face of the lid 322 that is exposed downward is positioned at its highest point inside the fuel cell system box 5.

The hydrogen sensor 348 for measuring the hydrogen concentration inside the fuel cell system box is arranged on the bottom face of the lid 322 that is exposed by the notch C, at the part of the fuel cell system box 5 that is at the center in the widthwise direction. Accordingly, the hydrogen gas inside the fuel cell system box 5 is gradually guided upward by the first spacer S1, second spacer S2 and third spacer S3, and directed to the hydrogen sensor 348.

Incidentally, the hydrogen circulation system 361 disposed behind the fuel cells 3 is a hydrogen supply accessory for supplying hydrogen gas to the fuel cell 3, while the dilution box 364 is hydrogen discharge accessory for discharging the hydrogen gas that has already reacted from the fuel cells 3. Accordingly, it would seem that the rear area of the fuel cells 3 which is the placement area of these hydrogen system accessories would have a higher hydrogen measurement frequency than other areas. It would be particularly conspicuous at the hydrogen circulation system 361. For this reason, the front fourth spacer S4 and rear fifth spacer S5 are arranged in this area in order to function as front and rear vertical walls, to guide the hydrogen gas upward as is without dispersion, and to have it measured by the hydrogen sensor 348. In other words, while the first spacer S1 to third spacer S3 guide the hydrogen gas horizontally, the fourth spacer S4 and fifth spacer S5 guide the hydrogen gas upward. The fourth spacer S4 and fifth spacer S5 are omitted from the drawings of FIGS. 13 to 15.

Figure 17:
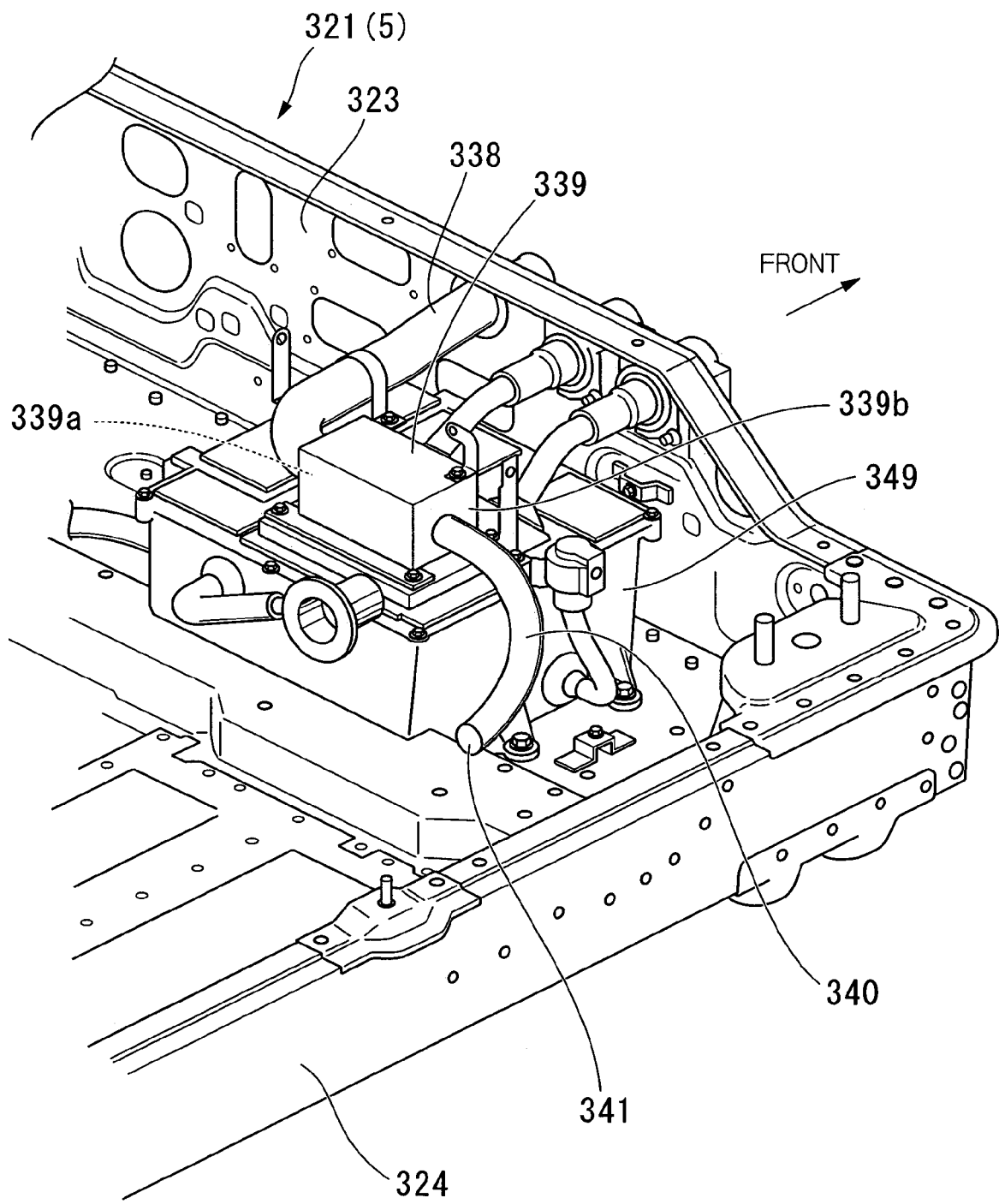
FIG. 17 is a perspective view of essential parts of the fuel cell system box of the third embodiment.

As specifically shown in FIG. 17, the induction tube (air conveyance means) 338 that passes through the front wall 323 of the fuel cell system box 5 is attached to the contact box 349. The induction tube 338 guides the ventilation air supplied from the fan (not shown) at the front of the fuel cell system box 5 to the interior of the fuel cell system box 5. The induction tube 338 that passes through the front wall 323 is connected to the left side wall 339a of the upper connection port 339 of the contact box 349. The supply tube (air conveyance means) 340 that supplies the ventilation air that passes through the interior of the contact box 349 from the front right side toward the rear inside the fuel cell system box 5 is connected to the right side wall 339b of the connection port 339. The open end (air conveyance means) 341 of the supply tube 340 is open toward the front end of the fuel cell 3 on the right side. The hydrogen sensor 348 is disposed front of the open end 341 of the supply tube 340 along the hydrogen flow.

In the case where the hydrogen concentration inside the fuel cell system box 5 increases, and where hydrogen is measured by the hydrogen sensor 348, the prescribed protective operations are conducted such as interrupting the supply of hydrogen to the fuel cells 3, suspending power generation by the contacts of the fuel cells 3, and increasing the quantity of air provided from the supply tube 340 using the air conveyance means.

With the third embodiment, hydrogen gas with lower specific gravity than air is measured by the hydrogen sensor 348 at the highest position inside the fuel cell system box 5 that is advantageous for measurement accuracy, with the result that measurement accuracy can be increased. In particular, as the hydrogen sensor 348 is positioned at the highest area in the bottom face of the lid 322, it is acceptable to use only one hydrogen sensor 348, and it is possible to bring about cost reductions compared to the case where a plurality of hydrogen sensors 348 are used.

In short, the effective height of the bottom face of the lid 322—that is, of the fuel cell system box 5—is adjusted by the first spacer S1, second spacer S2 and third spacer S3, with the result that hydrogen gas is gradually guided to the higher elevations of height H1, height H2 and height H regardless of the area where hydrogen gas exists, and that the hydrogen concentration is reliably and accurately measured there by the hydrogen sensor 348. In the area of the hydrogen circulation system 361 and dilution box 364 where measurement is most necessary, the hydrogen sensor 348 measures the hydrogen gas that is reliably led upward by the fourth spacer S4 and fifth spacer S5 that prevent horizontal dispersion of hydrogen gas. In particular, with the third embodiment, as the central part of the lid 322 in the widthwise direction has a substantially trapezoidal shape, it is advantageous in that it is able to more effectively guide the hydrogen gas from the side parts to the higher central part in the widthwise direction.

The ventilation air supplied from the fan at the front of the fuel cell system box 5 is introduced into the contact box 349 after transiting the induction tube 338, cools the contact box 349, and is subsequently discharged toward the rear from the open end 341 of the supply tube 340. This enables quick measurement of the ventilation air in a short period by the hydrogen sensor 348 positioned downstream from the open end 341 of the supply tube 340, and adoption of the prescribed protective operations.

In the third embodiment, the form and the like of the lid 322, for example, is but one example, and the form of the lid 322 is not limited by the aforementioned embodiment if it is able to bring about variations in the effective height of the ceiling of the fuel cell system box 5. Moreover, the spacers were shown as separated in a typical depiction, but a variety of modes may be adopted such as providing the respective spacers on the rear side of the lid 322 in an integral form.

While preferred embodiments of the invention have been described and illustrated above, it should be understood that these are exemplary of the invention, and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A fuel cell vehicle, comprising:
a fuel cell generating electricity by an electrochemical reaction of hydrogen and oxygen;
an accessory for the fuel cell; and
a fuel cell system box mounted on a vehicle body and housing the fuel cell and the accessory, wherein
the fuel cell system box is formed in a vessel shape which has a bottom wall, a first side wall, and a second side wall, and
the fuel cell system box has front and rear skeletal members provided at the front and rear of the bottom wall and extending in a widthwise direction of the vehicle, an anti-vibration material is disposed between the front and rear skeletal members, and the fuel cell is fixed to the front and rear skeletal members, and
the front and rear skeletal members have peripheral flanges, and
the anti-vibration material is covered by a plate fixed to the front and rear skeletal members, and
the plate has a front flange and a rear flange, and
a space is formed between the plate and a top face of the bottom wall of the fuel cell system box, the space being filled with the anti-vibration material, and
the front flange of the plate and the peripheral flange of the front skeletal member are joined together and fixed to the bottom wall of the fuel cell system box, and the rear flange of the plate and the peripheral flange of the rear skeletal member are joined together and fixed to the bottom wall of the fuel cell system box, and
the fuel cell is fixed via brackets to the front skeletal and rear skeletal members.

2. A fuel cell vehicle according to claim 1, wherein the pipe passes through the first side wall.

3. A fuel cell vehicle according to claim 1, wherein the first side wall is constituted of an iron material, and the bottom wall and the second side wall are constituted of an aluminum material.

4. A fuel cell vehicle according to claim 3, wherein the first side wall having a coating thereon is connected to the bottom wall and the second side wall by riveting.

5. A fuel cell vehicle according to claim 1, further comprising:
   a lid covering an upper part of the fuel cell system box and having an under surface formed with a varying height; and
   a hydrogen sensor placed at an elevated position inside the fuel cell system box and measuring a hydrogen concentration inside the fuel cell system box.

6. A fuel cell vehicle according to claim 5, wherein
   the lid has spacers varying the height of the undersurface of the lid and guiding the hydrogen to the hydrogen sensor.

7. A fuel cell vehicle according to claim 5, further comprising:
   an air conveyance means conveying ventilation air into the fuel cell system box, wherein
   the hydrogen sensor is arranged downstream of the ventilation air inside the fuel cell system box.

8. A fuel cell vehicle according to claim 5, wherein
   the accessory has a hydrogen system accessory supplying hydrogen to the fuel cell or discharging hydrogen from the fuel cell.

9. A fuel cell vehicle, comprising:
   a fuel cell generating electricity by an electrochemical reaction of hydrogen and oxygen;
   an accessory for the fuel cell; and
   a fuel cell system box mounted on a vehicle body, formed in a vessel shape with a bottom wall and side walls, and housing the fuel cell and the accessory, wherein
   the fuel cell system box has front and rear skeletal members provided at front and rear of the bottom wall and extending in a widthwise direction of the vehicle, an anti-vibration material is disposed between the front and rear skeletal members, and the fuel cell is fixed to the front and rear skeletal members, and
   the front and rear skeletal members have peripheral flanges, and
   the anti-vibration material is covered by a plate fixed to the front and rear skeletal members, and
   the plate has a front flange and a rear flange, and
   a space is formed between the plate and a top face of the bottom wall of the fuel cell system box, the space being filled with the anti-vibration material, and
   the front flange of the plate is joined to the peripheral flange of the front skeletal member, and the rear flange of the plate is joined to the peripheral flange of the rear skeletal member, and
   the fuel cell is fixed via brackets to the front skeletal and rear skeletal members.

10. A fuel cell vehicle, comprising:
    a fuel cell generating electricity by an electrochemical reaction of hydrogen and oxygen;
    an accessory for the fuel cell;
    a fuel cell system box mounted on a vehicle body, formed in a vessel shape with a bottom wall and side walls, and housing the fuel cell and the accessory;
    a lid covering an upper part of the fuel cell system box and having an undersurface formed with a varying height, and
    a hydrogen sensor placed at an elevated position inside the fuel cell system box and measuring a hydrogen concentration inside the fuel cell system box,
    wherein the fuel cell system box has front and rear skeletal members provided at the front and rear of the bottom wall and extending in a widthwise direction of the vehicle, an anti-vibration material is disposed between the front and rear skeletal members, and the fuel cell is fixed to the front and rear skeletal members, and
    the front and rear skeletal members have peripheral flanges, and
    the anti-vibration material is covered by a plate fixed to the front and rear skeletal members, and
    the plate has a front flange and a rear flange, and
    a space is formed between the plate and a top face of the bottom wall of the fuel cell system box, the space being filled with the anti-vibration material, and
    the front flange of the plate is joined to the peripheral flange of the front skeletal member, and the rear flange of the plate is joined to the peripheral flange of the rear skeletal member, and
    the fuel cell is fixed via brackets to the front skeletal and rear skeletal members.

11. A fuel cell vehicle according to claim 10, wherein
    the lid has spacers varying the height of the undersurface of the lid and guiding the hydrogen to the hydrogen sensor.

12. A fuel cell vehicle according to claim 10, further comprising:
    an air conveyance means conveying a ventilation air into the fuel cell system box, wherein
    the hydrogen sensor is arranged downstream of the ventilation air inside the fuel cell system box.

13. A fuel cell vehicle according to claim 10, wherein
    the accessory has a hydrogen system accessory supplying hydrogen to the fuel cell or discharging hydrogen from the fuel cell.

14. A fuel cell vehicle according to claim 1, wherein the first side wall is constituted of a material having a specific gravity that is greater than that of the bottom wall and the second wall.

15. A fuel cell vehicle according to claim 1, wherein the first side wall supporting at least one pipe through which a fluid supplied to the fuel cell flows.

16. A fuel cell vehicle according to claim 1, wherein the fuel cell is placed on the plate.

17. A fuel cell vehicle according to claim 1, wherein a central part of the plate in the widthwise direction of the vehicle is fixed to the bottom wall of the fuel cell box so that the space is divided into two spaces and the anti-vibration material is inserted in each space.

* * * * *